(12) United States Patent
Zeng et al.

(10) Patent No.: US 9,258,495 B2
(45) Date of Patent: Feb. 9, 2016

(54) MULTI-SPECTRAL INFRARED IMAGING SYSTEM FOR FLARE COMBUSTION EFFICIENCY MONITORING

(71) Applicant: Providence Photonics, LLC, Baton Rouge, LA (US)

(72) Inventors: Yousheng Zeng, Baton Rouge, LA (US); Jon Morris, Baton Rouge, LA (US); Mark Dombrowski, San Diego, CA (US)

(73) Assignee: PROVIDENCE PHOTONICS, LLC, Baton Rouge, LA (US)

( * ) Notice: Subject to any disclaimer, the term of this patent is extended or adjusted under 35 U.S.C. 154(b) by 401 days.

(21) Appl. No.: 13/850,832

(22) Filed: Mar. 26, 2013

(65) Prior Publication Data
US 2013/0342680 A1    Dec. 26, 2013

Related U.S. Application Data

(60) Provisional application No. 61/662,781, filed on Jun. 21, 2012, provisional application No. 61/790,791, filed on Mar. 15, 2013.

(51) Int. Cl.
*H04N 5/33* (2006.01)
*G01J 5/00* (2006.01)
*G01J 5/08* (2006.01)

(52) U.S. Cl.
CPC .............. *H04N 5/332* (2013.01); *G01J 5/0014* (2013.01); *G01J 5/0806* (2013.01); *G01J 2005/0077* (2013.01)

(58) Field of Classification Search
CPC ................ G01J 5/0014; H04N 5/332
USPC ......................................... 348/135
See application file for complete search history.

(56) References Cited

U.S. PATENT DOCUMENTS

| | | | |
|---|---|---|---|
| 5,009,064 A * | 4/1991 | Grob et al. | 60/276 |
| 7,242,478 B1 | 7/2007 | Dombrowski et al. | |
| 7,433,042 B1 | 10/2008 | Cavanaugh et al. | |
| 2002/0192445 A1 * | 12/2002 | Ezzell et al. | 428/212 |
| 2011/0103547 A1 * | 5/2011 | Ohzawa | 378/45 |
| 2012/0270162 A1 * | 10/2012 | Dahlhielm et al. | 431/12 |
| 2015/0031929 A1 * | 1/2015 | Asoaka et al. | 585/733 |

* cited by examiner

*Primary Examiner* — Jamie Atala
*Assistant Examiner* — Fabio Lima
(74) *Attorney, Agent, or Firm* — Robert E. Bushnell, Esq.

(57) ABSTRACT

The multi-spectral imaging system for real-time measurement of combustion efficiency of an industrial flare is provided. The system includes four spectral bands, one for a hydrocarbon group (fuel), one for carbon dioxide ($CO_2$), product of complete combustion), one for carbon monoxide (CO, product of partially completed combustion), and one for background reference. More spectral bands can be added to measure combustion efficiency of specific compounds or enhance the background reference adjustment. The analysis apparatus includes a machine readable storage medium, which provides instructions that cause the analysis apparatus to perform operations to obtain the combustion efficiency of the flare. The operations includes acquiring at least three spatially and temporally synchronized intensities from an imaging unit capturing images of the flare, and producing the combustion efficiency of the flare from said at least three intensities, and absorption coefficients of materials contained in the flare.

24 Claims, 9 Drawing Sheets

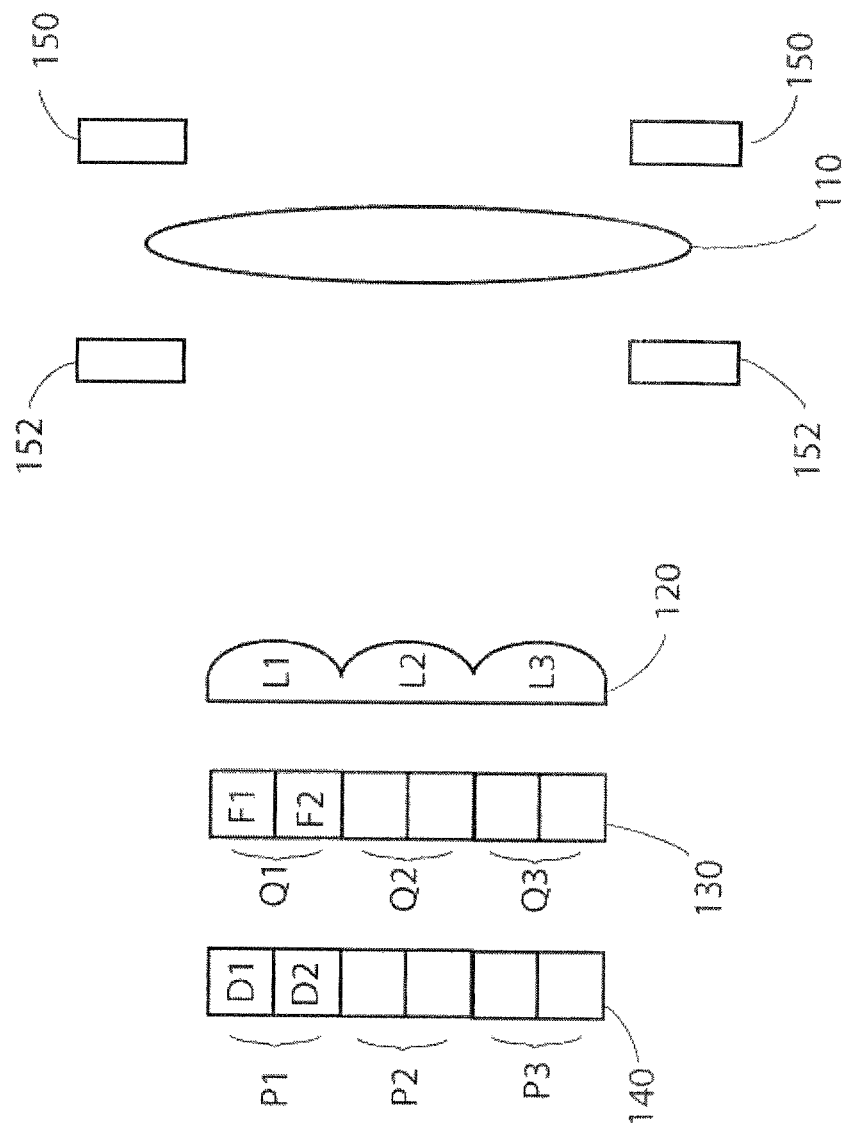

MULTI-SPECTRAL INFRARED IMAGING SYSTEM FOR FLARE COMBUSTION EFFICIENCY MONITORING

CLAIM OF PRIORITY

This application claims priority under 35 U.S.C. §119 to Provisional Patent Application No. 61/662,781, entitled "MULTI-SPECTRAL INFRARED CAMERA FOR FLARE EFFICIENCY MEASUREMENT" filed on 21 Jun. 2012, and Provisional Patent Application No. 61/790,791, entitled "MULTI-SPECTRAL INFRARED IMAGING SYSTEM FOR FLARE EFFICIENCY MEASUREMENT" filed on 15 Mar. 2013, which applications are incorporated herein by reference.

BACKGROUND OF THE INVENTION

1. Field of the Invention

The present invention relates to a multi-spectral infrared imaging system that provides real-time measurement of flare combustion efficiency, which would enable operators to adjust flare operating conditions to achieve higher efficiency. The multi-spectral infrared imaging system includes a machine readable storage medium, which provides instructions that cause the multi-spectral infrared imaging system to perform operations to obtain a combustion efficiency of a flare.

2. Description of the Related Art

Flares are widely used in chemical process industries (e.g., petroleum refineries, chemical plants, etc.). Due to the intended function and nature of flare design and operations, determination of flare combustion efficiency (CE) and destruction and removal efficiency (DRE) is extremely challenging. There has been a protracted debate on how much air pollutants are emitted from flares. The fact is that no one has a good answer to this question and this level of uncertainty regarding flare emissions is problematic for both regulators and industry.

In 2010, Texas Commission on Environmental Quality (TCEQ) contracted University of Texas at Austin (UT) to conduct a comprehensive study on flare CE and DRE. The field work was conducted at John Zink facility in Tulsa, Okla. The results were reported in "2010 TCEQ Flare Study Project Final Report," written by David T. Allen and Vincent M. Tones, on May 23, 2011. The results from this study were very valuable in characterizing flare CE and DRE, and had a lasting impact on flare operations and emission management. It should be noted that the study was successful in characterizing flare efficiency under the specific conditions targeted by the experiment design, however it did not cover flare operations under upset or emergency conditions, hydrogen flares, or flares specifically designed for routinely low flow applications.

The TCEQ-UT flare study was a major undertaking. The method used in this study could be referred to as "grab and measure" or "extractive sampling" method. However, it is not practical to use the same approach to measure or monitor flare operations on a regular basis. The TCEQ-UT study did include two supplemental remote sensing based measurement systems with an intention to evaluate their effectiveness for practical flare monitoring. The two systems were an infrared (IR) Hyper-Spectral Imager by Telops Inc. (Hyper-Cam) and a passive and active Fourier transform infrared (PFTIR and AFTIR, respectively, or FTIR for either) spectroscopy by Industrial Monitor and Control Corporation (IMACC).

The study results suggested that the flare CE determined by IMACC's PFTIR/AFTIR was generally consistent with the CE determined by analysis of pre- and post-combustion gas samples thru the "grab and measure" method. The mean differences between the two methods were about 2% to 2.5%, and average standard deviations were 2.8% to 3.2%. The data availability was 99% to 100%. The performance of Telops's Hyper-Spectral Imager was less desirable. The mean differences were 19.9%, standard deviations were 57.8%, and data availability was 39%.

Both the Telops's Hyper-Spectral Imager and the IMACC's FTIR are powerful instruments for many applications, particularly research projects. However, they have some significant shortcomings if they are to be used as industrial analyzers to determine flare CE. These shortcomings are identified below.

Fundamental/Technical Issues:

Telops' Hyper-Cam can be considered a two-dimensional array of FTIR spectrometers that can be combined to form images (i.e., each pixel in the image is equivalent to a single FTIR spectrometer). It has a scan rate of approximately 1 second per scan (depending on spectral resolution and other parameter settings). The flare plume changes rapidly in shape and position, and the resulting path length of the pixels in the Hyper-Cam Imager may change dramatically within the same data cube. This variability introduces unknown and uncontrollable factors into the pixel intensity-concentration equation, rendering calculations and results unreliable.

IMACC's FTIR is a path measurement instrument. The results only represent the region where the IR light path intersects the flare plume. Due to the heterogeneous and dynamic nature of a flare, using the measurement from a small path to represent the entire flare is a concern. The IMACC FTIR also has a relatively long scan time (seconds) and suffers the same problem as the Telops Hyper-Cam. Since the IMACC FTIR is a single-path measurement instrument, this variability can be minimized by pointing the instrument to the middle, thick portion of the flare plume where the relative change in path length is small. If the IMACC FTIR is aimed at the fringe of the flare plume, or if the flare diameter is small, the effect of this temporal mismatch due to flare plume dynamics is expected to be much more salient and problematic. Selection and alignment of the measurement path could significantly influence results. This makes it impractical for routine monitoring as the system would need some sort of targeting system to ensure it is consistently aimed at the correct position in the flare plume while the plume may be constantly shifting in wind.

Practical/Implementation Issues:

Both the Telops's Hyper-Cam and the IMACC FTIR are delicate research instruments and require expert-level personnel to operate. They require significant effort to set up and maintain, and significant effort is required for post-processing/analyzing data in order to derive flare CE results. They do not provide real-time or near real-time measurements, and are not suitable instruments to provide continuous real-time feedback to operational personnel. The total ownership cost is very high (this is particularly true for Telops' Hyper-Cam).

Flare emissions can swing over a wide range depending on operating conditions (e.g., amount of steam used to assist the flare). The current problem is that there is no mechanism to measure flare efficiency and provide timely feedback to flare operators to adjust operating conditions for a higher efficiency.

SUMMARY OF THE INVENTION

The multi-spectral infrared imaging system described in this specification is aimed at providing real-time measurement of flare efficiency, which would enable operators to adjust flare operating conditions to achieve higher efficiency. Considering contributions of flare emissions in total volatile organic compound and hazardous air pollutant emission inventories, the potential environmental benefit could be tremendous. An effective flare efficiency measurement tool will enable better flare operations and mitigate extremely high flare emissions that may otherwise go undetected. The proposed multi-spectral infrared imaging system is expected to be effective for all types of flares under all kinds of operating conditions.

The multi-spectral imaging system for measurement of combustion efficiency of a flare includes a micro-lens array including a plurality of micro-lenses, a bandpass filter array including a plurality of filters, a detector array including an imaging unit capturing images of the flare and an analysis apparatus coupled to the imaging unit. The imaging unit produces at least three intensities from the images of the flare. A first intensity of said at least three intensities represents an amount of a first material contained in the flare, a second intensity of said at least three intensities represents an amount of a second material contained in the flare, and a third intensity of said at least three intensities represents an amount of a third material contained in the flare. The first material includes fuel, such as unburned hydrocarbons, and the second material includes carbon dioxide ($CO_2$). The analysis apparatus includes a machine readable storage medium, which provides instructions that cause the analysis apparatus to perform operations to obtain the combustion efficiency of the flare. The operations includes steps of acquiring said at least three intensities from the imaging unit, retrieving a first absorption coefficient, a second absorption coefficient, a third absorption coefficient, and a weighted average carbon number for hydrocarbons expected in the flare vent gases, which are stored in the machine readable storage medium, and producing the combustion efficiency of the flare from said at least three intensities, the first absorption coefficient, the second absorption coefficient, the third absorption coefficient, and the weighted average carbon number for hydrocarbons expected in the flare vent gases. The first absorption coefficient is an absorption coefficient of the first material, the second absorption coefficient is an absorption coefficient of the second material, and the third absorption coefficient is an absorption coefficient of the third material.

The fuel may include hydrocarbon. The third material may include carbon monoxide (CO).

In addition to the at least three intensities, a fourth intensity may be acquired and used as a reference intensity to correct background infrared intensity. The step of producing the combustion efficiency of the flare includes producing the combustion efficiency of the flare from the at least three intensities corrected using the fourth reference intensity, the first absorption coefficient, the second absorption coefficient, the third absorption coefficient, and the weighted average carbon number of the hydrocarbons.

The imaging unit may include an objective lens, a detector array including a plurality of detectors, a micro-lens array disposed between the objective lens and the detector array, and a bandpass filter array disposed between the micro-lens array and the detector array or at the aperture stop of the objective lens. Each of the detectors includes a plurality of sub-detectors. The detector array detects intensities from the images of the flare. The micro-lens array includes a plurality of micro-lenses. The bandpass filter array includes a plurality of bandpass filters. Each of the bandpass filters includes a plurality of sub-filters. The sub-filters have different wavelength bandpass windows from each other. The images of the flare passing through one of the micro-lenses are transmitted to one of the bandpass filters and being detected by one of the detectors.

The first intensity is an intensity of the images of the flare passing through a first one of the sub-filters, the second intensity is an intensity of the same images of the flare passing through a second one of the sub-filters, the third intensity is an intensity of the same images of the flare passing through a third one of the sub-filters, and the fourth intensity is an intensity of the same images of the flare passing through a fourth one of the sub-filters.

The first one of the sub-filters may have a wavelength bandpass window of absorption of hydrocarbons.

The second one of the sub-filters may have a wavelength bandpass window of absorption of carbon dioxide.

The third one of the sub-filters may have a wavelength bandpass window of absorption of carbon monoxide

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 shows an example of an arrangement of a micro-lens array and a bandpass filter array.

DETAILED DESCRIPTION OF THE INVENTION

The present invention will now be described more completely with reference to the accompanying drawings, in which exemplary embodiments of the invention are shown.

In the present invention, a multi-band infrared (IR) staring imager or imaging system for flare combustion efficiency (CE) measurement is proposed in order to overcome the problems described in the previous section and to be effective even under upset, emergency or routinely low flow conditions not covered by the TCEQ-UT study. The proposed IR imager utilizes a special arrangement of micro-lens array (MLA) optics which allow the imager to simultaneously image the flare in multiple spectral bands, each capable of imaging one gas. In one embodiment, the proposed multi-spectral IR imager has four spectral bands. The first band (Band 1), for example, can be set to take images of hydrocarbon (HC), the second band (Band 2) for carbon dioxide ($CO_2$), the third band (Band 3) for carbon monoxide (CO), and the fourth band (Band 4) for a background reference or spare. The fourth band can be used as general background signal for correcting effect of sky/cloud condition changes, steam plume, etc., or for a gas of particular interest.

Figure 1:
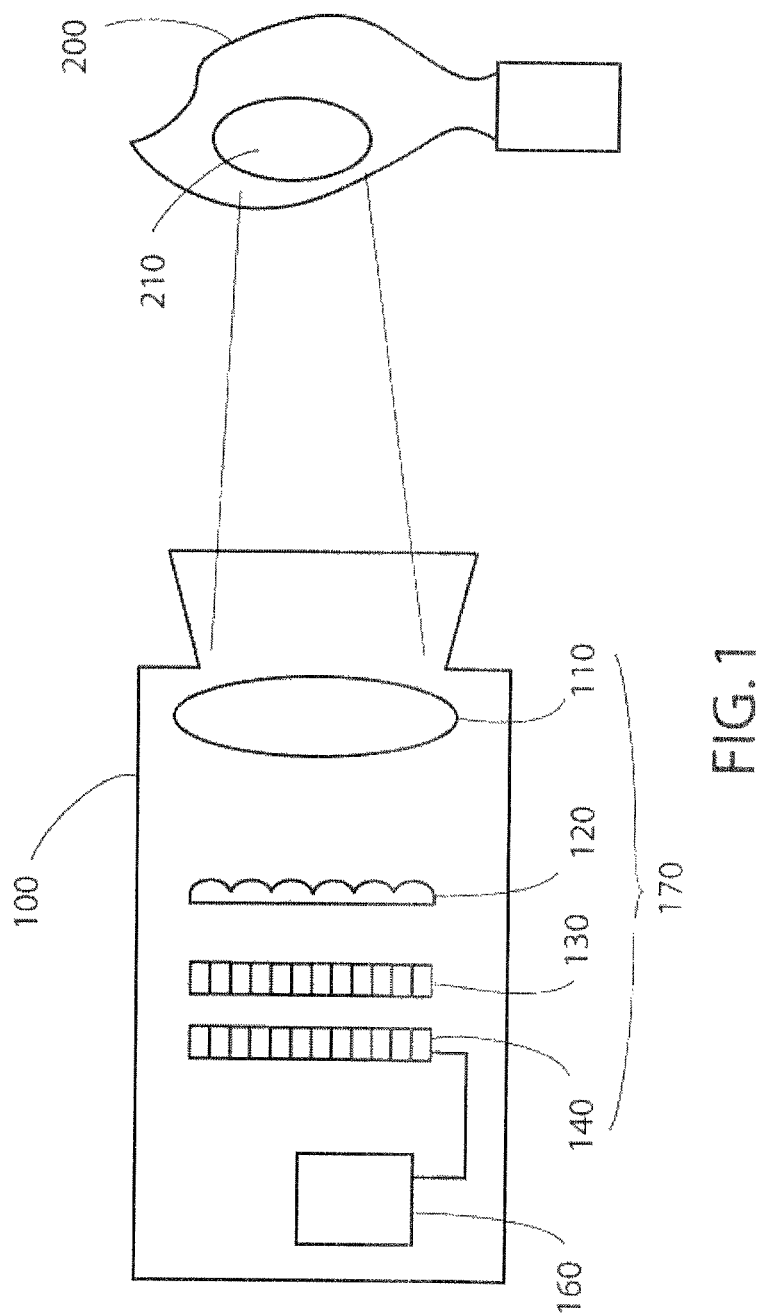
FIG. 1 schematically illustrates a multi-spectral infrared imaging system detecting flare to measure combustion efficiency of the flare.

FIG. 1 shows a multi-spectral infrared (IR) imaging system 100 constructed as an embodiment of the present invention. The multi-spectral IR imaging system 100 is an apparatus that takes images of a flare 200 located at some distance from the multi-spectral IR imaging system 100, and then analyzes these images to obtain data, such as intensities, of specific materials contained in the flare 200. The multi-spectral imaging system 100 calculates the flare combustion efficient (CE) from the data of the specific materials. The multi-spectral infrared (IR) imaging system 100 can be referred to as a multi-spectral infrared (IR) imager.

Figure 2:
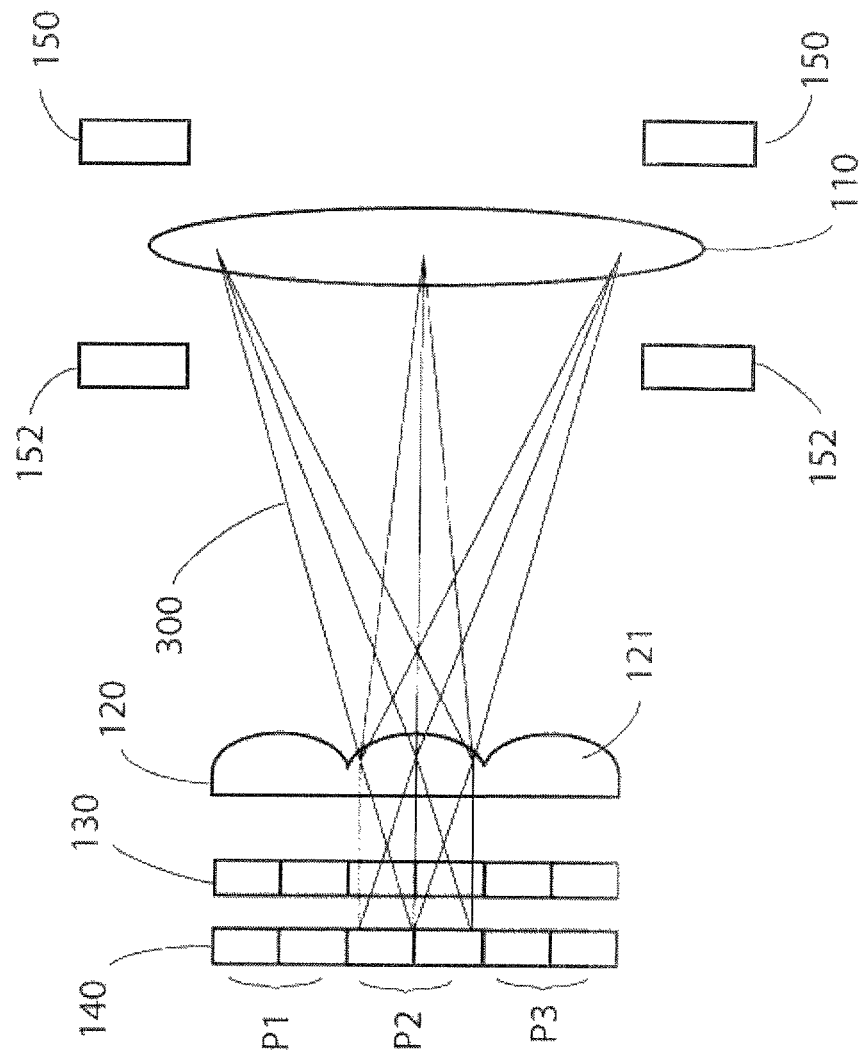
FIG. 2 schematically illustrates an arrangement of optical elements in the multi-spectral infrared imaging system.

The multi-spectral IR imaging system 100 includes an imaging unit 170, which captures images of the flare 200, and an analysis apparatus 160 coupled to the imaging unit 170. The analysis apparatus 160 analyzes the image data produced from the imaging unit 170. The imaging unit 170 includes any imaging apparatus that is capable of producing at least three different intensities from the images of the flare 200. More specifically, the imaging unit 170 may produce four different intensities from the images of the flare 200 to measure the combustion efficiency of the flare 200. An example of the imaging unit 170 that can be employed in the multi-spectral IR imaging system 100 is shown in FIG. 1. The imaging unit 170 includes an objective lens 110, a micro-lens array 120, a bandpass filter array 130, and a detector array 140. The multi-spectral IR imaging system 100 further includes an analysis apparatus 160 that analyzes the image data produced by the detector array 140. FIG. 2 shows a detailed structure and arrangement of the objective lens 110, the micro-lens array 120, the bandpass filter array 130, and the detector array 140. FIG. 2 also shows ray tracing of the optical path for one super-pixel. FIG. 3 shows an example of an arrangement of micro-lens array and a bandpass filter array, showing super-pixels P1, P2, and P3 of detector array 140, which includes a plurality of sub-pixels D1 and D2 of detector array 140 (sub-pixels D3 and D4 are behind D1 and D2 and are not shown in FIG. 3).

Referring to FIGS. 1, 2 and 3, a portion 210 of a flare 200 is focused by the objective lens 110. The objective lens 110 has the utility of producing a focused image of an object on a focal plane. The objective lens 110 may be an objective lens that can be generally found in an imaging system and is made of materials suitable for IR optics. The micro-lens array 120 is positioned behind the objective lens 110, approximately at a position on which the focal plane of the objective lens 110 is formed. The micro-lens array 120 includes a plurality of micro-lenses 121 that are arranged in a two dimensional array having rows and columns. Light rays 300 passing through the objective lens 110 are transmitted through the micro-lens array 120 and the bandpass filter 130, and are detected by the detector array 140. The micro-lens 121 of the micro-lens array 120 is placed at the image formed by the objective lens and each micro-lens functions as a field lens. Such a field lens in this application serves to focus the chief rays of the objective lens at the detector, effectively imaging the objective lens aperture stop onto the detector. In an alternate implementation, the bandpass filter array 130 can be placed at the objective lens aperture stop.

The detector array 140 includes a plurality of detectors P1, P2 and P3 (in FIG. 3) that are arranged in a two dimensional array. The detectors of the detector array 140 can be multi-band detectors or single band detectors that are sensitive for infrared (IR) rays. The bandpass filter array 130 is disposed between the micro-lens array 110 and the detector array 140, or at the objective lens aperture stop. The bandpass filter array 130 includes a plurality of bandpass filters Q1, Q2 and Q3 (in FIG. 3) arranged in a two dimensional array. The images collimated in the micro-lens array 120 pass through the bandpass filter array 130, and are detected by the detector array 140.

FIG. 3 shows an example of an arrangement of micro-lens array and a bandpass filter array. Elements (detectors) of the detector array 140 can be grouped in super-pixels P1, P2 and P3. FIG. 3 exemplarily shows three super-pixels for the purpose of explanation, but the number of the super-pixels is not limited to three. The number of super-pixels determines the image resolution for each image of a spectral band. As described above, in this embodiment, the multi-spectral IR imaging system 100 has four spectral bands to take images of different materials. The super-pixel represents one image pixel for each of the four spectral bands. Each of the super-pixels of the detector array 140 further includes sub-pixels D1, D2, D3 and D4. A detector P1, P2 and P3 of the detector array 140 can be represented as a super-pixel, and the sub-pixels of the detector array can be referred to as sub-detectors. The sub-pixels may form a two-dimensional array. For example, the sub-pixels D1, D2, D3 and D4 may form a 2×2 array. In this embodiment, as the multi-spectral IR imaging system 100 includes four spectral bands, one super-pixel has four sub-pixels, but the number of sub-pixels is not limited to four. If detection of more than four materials included in the flare 200 is required, more sub-pixels can be added in a super-pixel to detect the additional materials.

The bandpass filter array 130 is used to create different wavelength responses in each of the sub-pixels within each super-pixel. The elements of the bandpass filter array 130 can be grouped into super-pixels Q1, Q1 and Q3, which are aligned to super-pixels P1, P2 and P3 of the detector array 140, respectively. Each of the super-pixels of the bandpass filter array 130 includes a plurality of sub-filters F1 and F2. In this embodiment, the multi-spectral IR imaging system 100 has four spectral bands to take images of different materials. Therefore, each of the super-pixel of the bandpass filter array 130 includes four sub-filters F1, F2, F3 and F4. Each of the sub-filters of the bandpass filter array 130 is aligned with one of the sub-pixels of the detector array 140. In this embodiment, the sub-filters may form a two-dimensional array. If placed at the objective lens stop, the sub-filters F1 through F4 form a single array, not a two-dimensional array. Each micro-lens 121 of the micro-lens array 120 images each element of the filter array 130 onto a corresponding sub-pixel in the super pixel behind the micro-lens. For instance, bandpass filter F1 may be imaged onto sub-pixel D1, filter F2 onto sub-pixel D2, filter F3 onto sub-pixel D3, and filter F4 onto sub-pixel D4.

Figure 4A:
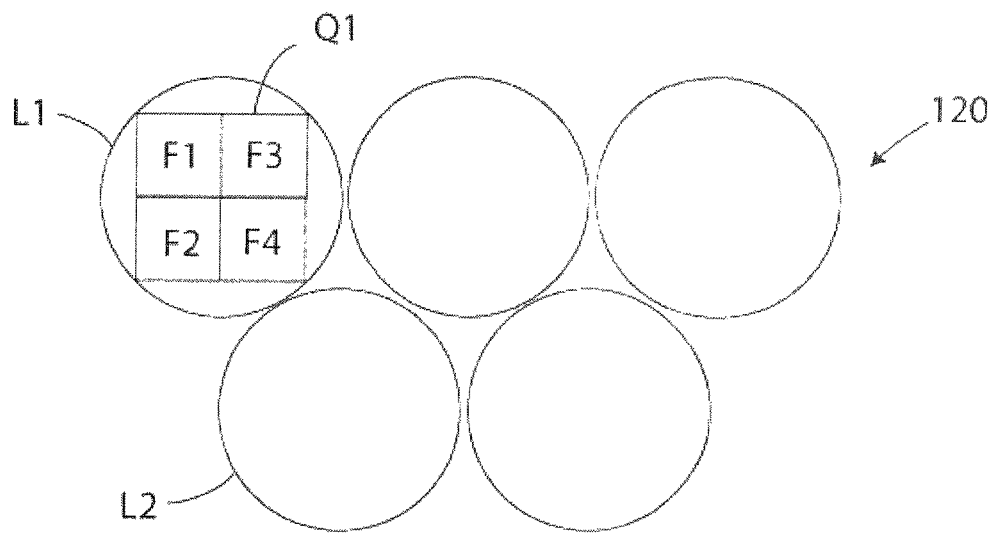
FIGS. 4A and 4B show examples of an arrangement of the micro-lenses of micro-lens array and the sub-filters of the bandpass filter array.
Figure 4B:
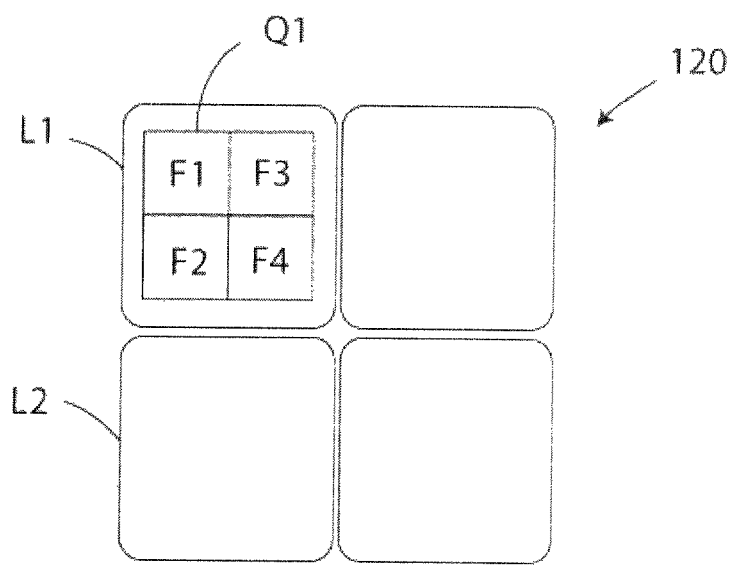

For example, the sub-filters F1, F2, F3 and F4 may form a 2×2 array, as shown in FIGS. 4A and 4B. In this embodiment, as the multi-spectral IR imaging system 100 includes four spectral bands, one super-pixel of the bandpass filter array 130 has four sub-pixels, but the number of sub-pixels is not limited to four. If detection of more materials included in the flare 200 is required, more sub-pixels can be added in a super-pixel to detect the additional materials. All sub-detectors D1, D2, D3 and D4 of one detector of the detector array may receive substantially the same image, and all sub-filters F1, F2, F3 and F4 of one bandpass filter of the bandpass filter array may receive substantially the same image.

The micro-lens array 120 is used as an array of field lenses with each lens corresponding to a super-pixel. The micro-lens array 120 includes a plurality of micro-lenses L1, l2 and L3. Each of the micro-lens of the micro-lens array 120 is aligned to a super-pixel of the bandpass filter array 130 and a super-pixel of the detector array 140, as shown in FIGS. 3 and 4. Images passing each sub-filter of the bandpass filter array 130 are detected by corresponding one of the sub-detectors of the detector array 140. In other words, each of the sub-detectors of the detector array 140 is aligned to one of the sub-filters of the bandpass filter array 130 to detect the images passing through the one of the sub-pixels.

Referring to FIG. 2, the multi-spectral infrared (IR) imaging system 100 may further include an entrance aperture 150, which represents the entrance pupil of the optical system, and an exit aperture 152, which represents the exit pupil of the optical system. These pupils are images of the aperture stop that limits the axial cone of energy from the object. The entrance and exit apertures 150 and 152 may be actual objects or merely images of the aperture stop. To maximize light throughput and minimize crosstalk from adjacent super-pixels, the shape of the exit aperture 152 should match the shape (outline) of the layout of the detector pixels used to form the super-pixel. The focal length of micro-lens array 120 should be designed to produce a de-magnified image of exit pupil 152 that matches the layout of the detector pixels. The entrance aperture 150 defines the shape of the light incident on the bandpass filter array 130.

FIGS. 4A and 4B show examples of an arrangement of the micro-lenses of micro-lens array 120 and the sub-filters F1 through F4 of the bandpass filter array 130, when viewed from the objective lens 110, in the case that the multi-spectral IR imaging system has four spectral bands. FIG. 4A shows a staggered pattern with circular micro-lenses, and FIG. 4B shows a regular pattern with square micro-lenses.

Referring to FIGS. 4A and 4B, the super-pixel Q1 of the bandpass filter array 130 includes sub-filters F1, F2, F3, and F4 arranged in a 2×2 array. A single micro-lens L1 of the micro-lens array 120 completely covers the super-pixel Q1, transmitting light onto the sub-filters F1, F2, F3, and F4. Through this arrangement, the spatially synchronized structure can be achieved. Sub-pixels (or sub-detectors) of the detector array 140 are arranged with the same pattern as the sub-filters of the bandpass filter array 130. For example, a sub-pixel D1, shown in FIG. 3, can be positioned behind the sub-filter F1, being covered by or overlapping with the sub-filter F1.

In FIGS. 4A and 4B, the shapes of the micro-lenses are illustrated as a circle shape and square shape, respectively, but the micro-lens can be constructed in a different shape, such as a rectangle or a hexagon. The arrangement of the sub-filters F1, F2, F3, and F4 shown in FIG. 4 is an example for the purpose of explanation, but different arrangement can be employed. However, regardless of the shape of the micro-lens and the arrangement of the sub-pixels, a single micro lens spreads the light incident onto the area of a super-pixel. The size of the micro-lens should roughly match the size of the super-pixel shape. The micro-lens is placed at the image formed by the objective lens and each micro-lens functions as a field lens, reducing the divergence spread of the light rays, making the light more collimated. The direction of each cone of light projected from the objective lens is changed so that the cone is bent toward the centerline. Light focused to a point at the micro-lens is spread across the super-pixel area. An image formed at the focus of the objective lens is refocused at the super-pixel. Each lens has an effective collection aperture and the light received at any point in the aperture is distributed evenly across the underlying super-pixel. The pitch of the micro-lenses is adapted to the size of the super-pixel.

Figure 5:
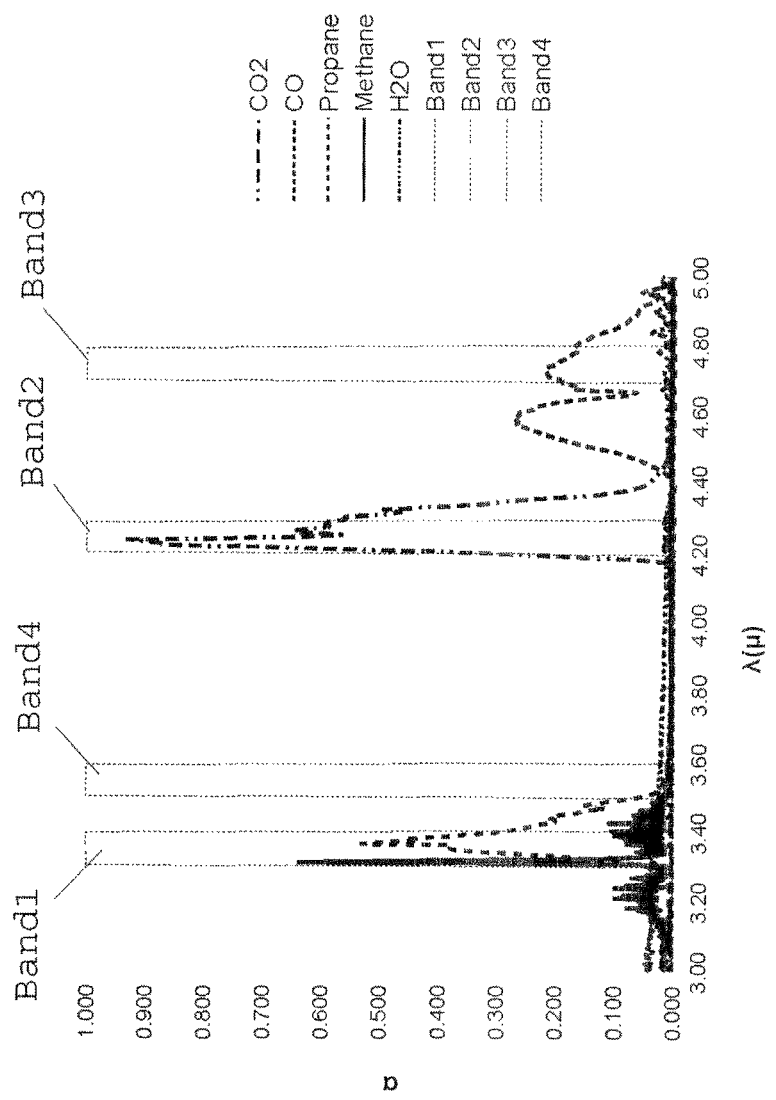
FIG. 5 shows absorption bands for carbon dioxide ($CO_2$), carbon monoxide (CO), hydrocarbon (HC) and water ($H_2O$).

FIG. 5 shows an example of four spectral bands for carbon dioxide ($CO_2$), carbon monoxide (CO), and hydrocarbon (HC) that can be propane, methane or other hydrocarbon compounds. As described above, in one embodiment, the multi-spectral IR imaging system 100 has four spectral bands. The first band (Band 1) is set to take images of hydrocarbons (HC) that may include propane and methane, the second band (Band 2) for carbon dioxide ($CO_2$), the third band (Band 3) for carbon monoxide (CO), and the fourth band (Band 4) for a background reference. Each sub-pixel of the bandpass filter array 130 represents one band among the first through fourth band.

Each of the sub-pixels of the bandpass filter array 130 can be fabricated in order to have the specific spectral windows Band1, Band2, Band3 and Band4, as shown in FIG. 5. The spectral window for each sub-filter can be referred to as a wavelength bandpass window of the sub-filter. Carbon dioxide ($CO_2$) shows non-zero absorption around the wavelength between about 4.2 µm and about 4.45 µm. Hereinafter, a wavelength bandpass window of absorption of a material is defined as a wavelength range, in which the material shows substantial non-zero absorption. Therefore, the wavelength bandpass window of absorption of carbon dioxide can be a wavelength range between 4.2 µm and 4.45 µm. Carbon monoxide (CO) has non-zero absorption around the wavelength between 4.4 µm and 4.95 µm. Methane has non-zero absorption around the wavelength between 3.1 µm and 3.5 µm, and propane has non-zero absorption around the wavelength between 3.3 µm and 3.5 µm. Therefore, the wavelength bandpass window of absorption of carbon monoxide is a wavelength range between 4.4 µm and 4.95 µm, and the wavelength bandpass window of absorption of hydrocarbon, including methane and propane, can be a wavelength range between 3.1 µm and 3.5 µm.

Based on these different absorption bands of materials, sub-filters of the bandpass filter array 130 can be manufactured as filters that select specific wavelength bands. For example, the sub-filter F1 can be a bandpass filter that allows transmission of the wavelength between 3.3 µm and 3.4 µm (Band1) to detect the amount of hydrocarbon (propane and methane) while blocking other wavelength. If the flare does not include hydrocarbon, the intensity of light through the sub-filter F1 would be near zero with respect to the reference band (Band 4). With the same principles, the sub-filter F2 can be a bandpass filter for the wavelength between 4.2 µm and 4.3 µm (Band2) for carbon dioxide, the sub-filter F3 can be a bandpass filter for the wavelength between 4.7 µm and 4.8 µm (Band3) for carbon monoxide. The sub-filter F4 can be assigned for a background reference. In the graph shown in FIG. 5, none of the carbon dioxide, carbon monoxide, methane and propane has a peak in the wavelength range between 3.5 µm and 4.15 µm. Therefore, this wavelength range can be assigned for the sub-filter F4. In one embodiment shown in FIG. 5, the sub-filter F4 can be a bandpass filter for the wavelength between 3.5 µm and 3.6 µm for the background reference. The wavelength ranges described in this paragraph are examples, and are not limited to these ranges. As long as a material, for example carbon dioxide, shows a reasonable non-zero absorption peak at a wavelength range, this wavelength range of the absorption peak can be selected for the band of this material. For example, FIG. 5 shows the band for hydrocarbon is the wavelength range of 3.3 µm and 3.4 µm. However, a sub-filter having a bandpass filter wavelength of 3.2 µm and 3.3 µm can be used for hydrocarbon.

In the above paragraph, the wavelength range for each sub-filter is exemplarily presented, but the wavelength ranges for the sub-filter can be selected narrower or broader than the examples presented above. For example, if a separate measurement of the amounts of methane and propane is required, additional sub-filter can be added for the wavelength between 3.2 μm and 3.3 μm for methane only, and the selected wavelength for Band1 can be adjusted to be 3.3 μm and 3.4 μm for both propane and methane. This type of filter is referred to as narrow bandpass filter in the infrared imaging industry. The basic principles of fabricating these bandpass filters are known in the art, and will not be described in this specification. Different coating material can be used to fabricate each subs-filter of the bandpass filter array 130.

In the embodiment shown in FIG. 5, absorption peaks are exemplarily shown in the infra-red wavelength range. However, the wavelength range in the embodiment is not limited to this infra-red wavelength range as shown in FIG. 5. The present embodiment can cover any wavelength range, including mid-wave infra-red, visible and ultra-violet wavelength range, in which the material to be detected exhibits an absorption peak. For example, nitrogen oxides in flame may show an absorption peak in the ultra-violet wavelength range. In this case, a sub-filter having a bandpass filter wavelength in the ultra-violet range can be selected to detect the amount of nitrogen oxides. The sub-filter for detecting nitrogen oxides can replace one of the exiting sub-filters or can be added to the existing sub-filters increasing the total number of sub-filters.

Once again, in the embodiment shown in FIG. 5, absorption peaks of methane and propane are exemplarily presented to represent absorption peaks of hydrocarbon materials. The hydrocarbon materials, which may be contained in industrial flare or flare from other combustion devices such as combustion chambers of boilers and furnaces, are the common form of fuel, and therefore the two terms, fuel and hydrocarbons, can be used interchangeably in the description of embodiments. Fuel is any combustible materials. Fuel may be comprised of a single compound in some instances or a mixture of multiple combustible compounds in other instances. Examples of fuel include natural gas, propane, refinery fuel gas, liquefied petroleum gas, coal gas, reformed gas, and producer gas.

Hereinafter, measurement methods of the flare combustion efficiency (CE) will be described. The multi-spectral infrared imager 100 images the entire flare plume or a substantial portion of the flare plume. Each pixel in the image represents a small portion of the flare plume. Computer vision algorithms will identify the boundaries of the plume, and the intensity of each pixel inside the plume can be proportional to the concentration of the target gas and the effective path length through the plume.

A typical flare burns unusable or unrecoverable hydrocarbons (HC). A generic expression of hydrocarbon combustion in a flare can be expressed as follows.

$$C_nH_y + n\frac{y}{2}O_2 \rightarrow nCO_2 + \frac{y}{2}H_2O$$

If the combustion is complete (CE=100%), the products of combustion would be $CO_2$ and $H_2O$. If the combustion is incomplete, there will be some unburned hydrocarbons and some intermediate combustion products, which commonly consist of CO. The flare CE can be determined by the following Equation (1):

$$CE(\%) = \frac{[C]_{CO_2}}{\sum_i n_i[C]_{HCi} + [C]_{CO_2} + [C]_{CO}} \quad \text{Eq. (1)}$$

where $n_i$ is a number of carbon atoms in hydrocarbon compound i (HCi). The terms in brackets [ ] on the right side of Equation (1) are for concentrations of compounds indicated by the subscripts and expressed in parts per million by volume (ppmv). The three compounds (i.e., combined HC, $CO_2$, and CO) are measured by spectral Bands 1 through 3, respectively, of the multi-spectral infrared imager 100.

Each pixel in the image generated by the multi-spectral infrared imager 100 represents a small volume of the flare plume, and is equivalent to the path measurement made by the passive Fourier transform infrared (PFTIR) with a lower spectral resolution. The difference between the multi-spectral infrared imager 100 and the PFTIR is that PFTIR scans a wide spectral range through a single path length, whereas the multi-spectral infrared imager 100 images each gas in each of four fixed spectral ranges for each pixel in the field of view. As a result, this multi-spectral infrared imager 100 can achieve a frame rate of 30 fps with complete spatial and temporal synchronization, therefore overcoming the technical problems of the FTIR and Hyper-Spectral Imager described in the previous section. With this frame rate, changes in effective path length of flare plume are negligible. Because the measurement can be done for the entire flare plume, the issue of aiming the PFTIR or active Fourier transform infrared (AFTIR) to the right point of the flare is no longer a concern.

The relationship between the concentrations of compounds in Eq. (1) and the intensity of IR signal strength measured by the multi-spectral camera can be derived from the radiative transfer theory or radiative transfer equation. A simplified radiative transfer equation without consideration of light scattering can be expressed in Equation (2) as follows:

$$I = \epsilon(\lambda)B(T_b,\lambda)\exp^{[-\alpha(\lambda)CL]} + B(T_g,\lambda) - B(T_g,\lambda)\exp^{[-\alpha(\lambda)CL]} \quad \text{Eq. (2)}$$

where I is an intensity of infrared radiance, $\epsilon(\lambda)$ is an emissivity of background (e.g. cloud in the sky) at the wavelength of $\lambda$, $\alpha(\lambda)$ is an absorption of gas in the flare plume at wavelength of $\lambda$, C is the concentration of a compound of interest (i.e., HC, $CO_2$, or CO), L is a path length of flare plume region represented by the pixel in the image, and B(T, $\lambda$) is a black body radiation at temperature T and wavelength $\lambda$. The subscript 'b' indicates temperature of background, and the subscript 'g' indicates temperature of gases in the flare plume.

B(T, $\lambda$) is calculated by Plank's Law shown in Equation (3):

$$B(T, \lambda) = \frac{2hc^2}{\lambda^5} \frac{1}{e^{\frac{hc}{\lambda k_B T}} - 1} \quad \text{Eq. (3)}$$

where h is Plank's constant, c is speed of light, and $k_B$ is Boltzmann constant. For flare plume, the temperature of the gas is much greater than the temperature of the background ($T_g \gg T_b$), and therefore, Equation (2) is approximated as:

$$I = B(T_g,\lambda) - B(T_g,\lambda)\exp^{[-\alpha(\lambda)CL]} \quad \text{Eq. (4)}$$

Taylor expansion $$e^x = 1 + \frac{x}{1!} + \frac{x^2}{2!} + \frac{x^3}{3!} + \ldots$$

can be applied to the exponent term in Eq. (4). When $x \ll 1$, $e^x \approx 1+x$. For a flare plume, the term $\alpha(\lambda)$ CL is significantly less than 1. Eq. (4) can be further simplified:

$$I \approx B(T_g,\lambda) - B(T_g,\lambda)[1-\alpha(\lambda)CL] = B(T_g,\lambda)\alpha(\lambda)CL \quad \text{Eq. (5)}$$

The concentration C can be obtained through by rearranging Equation (5).

$$C = \frac{I}{B(T_g,\lambda)\alpha(\lambda)L} \quad \text{Eq. (6)}$$

Substituting concentration [C] terms in Eq. (1) with Eq. (6), and using subscripts 1, 2, and 3, for HC (Band 1), $CO_2$ (Band 2), and CO (Band 3), respectively, an equation for flare CE measurement is obtained:

$$CE(\%) = \frac{\frac{I_2}{B(T_g,\lambda_2)\alpha(\lambda_2)}}{\overline{n}\frac{I_1}{B(T_g,\lambda_1)\overline{\alpha}(\lambda_1)} + \frac{I_2}{B(T_g,\lambda_2)\alpha(\lambda_2)} + \frac{I_3}{B(T_g,\lambda_3)\alpha(\lambda_3)}} \quad \text{Eq. (7)}$$

The plume depth (plume path length) L represented by the pixel is the same for all four bands and therefore is cancelled out in the process of deriving the above equation. This approach is valid when the frame rate is higher than the rate of change in L. The terms $\overline{n}$ and $\overline{\alpha}(\lambda_1)$ are weighted average values of n and a for the hydrocarbons expected in the flare vent gas. The terms $\alpha(\lambda_2)$ and $\alpha(\lambda_3)$ are the absorption coefficients for $CO_2$ and CO at the wavelengths selected for spectral bands 2 and 3, respectively, the values of which can be obtained from the standard IR spectra of $CO_2$ and CO.

The IR intensities $I_1$, $I_2$, and $I_3$ in Eq. (7) are measured with the multi-spectral infrared imager 100 as shown in FIG. 1. In this exemplary embodiment, a super-pixel Q1 of the bandpass filter array 130 has four sub-filters F1, F2, F3 and F4. The sub-filter F1 works as a wavelength filter for hydrocarbon (Band1), and the intensity $I_1$ of light passing through the sub-filter F1 is obtained. The sub-filter F2 works as a wavelength filter for carbon dioxide (Band2), and the intensity $I_2$ of light passing through the sub-filter F2 is obtained. The sub-filter F3 works as a wavelength filter for carbon monoxide (Band3), and the intensity $I_3$ of light passing through the sub-filter F3 is obtained. The sub-filter F4 works as a background reference (Band4), representing relatively constant background IR intensity caused by broadband IR radiation from soot particles, steam droplets, or/and water vapor in the plume and experienced by all Bands 1-4. The intensity $I_4$ of light passing through the sub-pixel F4 can be used as a reference. To reduce various potential interferences that could be caused by soot particles, steam droplets, or/and other materials in the flare plume, the actual intensities used in Eq. (7) are the result of the intensity measured by the spectral band 1, 2, or 3 minus the intensity measured by the spectral band Band4 (the reference band), i.e., the intensities relative to reference band and attributable only to the respective gases of HC, $CO_2$, and CO. In this case, the IR intensities $I_1$, $I_2$, and $I_3$ in Eq. (7) (and Eq. (9) below) are relative intensities. The relative intensity is defined as the intensity measured by the spectral band 1, 2, or 3 minus the intensity measured by the spectral band Band4. The intensity measured by the spectral band Band4 is referred to as a reference intensity. Equation (8) below is used to calculate the relative intensities.

$$I_i = I_i^* - I_4^* \quad \text{Eq. (8)}$$

where $I_i^*$ represents intensity (or raw intensity), $I_i$ represents relative intensity to be used in CE calculation, and i=1-3.

One more item in Eq. (7) needs to be addressed in order to calculate the flare CE, and that is $B(T_g, \lambda_i)$ where i=1, 2, or 3. $B(T_g, \lambda_i)$ can be calculated by Eq. (3). There are three $B(T_g, \lambda_i)$ terms in Eq. (7) and the only difference among the three $B(T_g, \lambda_i)$ are the wavelength. Three methods are proposed below to determine the $B(T_g, \lambda_i)$ values:

In the first method (Method 1), it is assumed that the 4 wavelengths ($\lambda$'s) are close enough and their corresponding $B(T_g, \lambda_i)$ are set to be equal. Therefore all $B(T_g, \lambda_i) = B(T_g)$ and they are all cancelled out from Eq. (7). In this case, Eq. (7) is reduced to Eq. (9) below.

$$CE(\%) = \frac{\frac{I_2}{\alpha(\lambda_2)}}{\overline{n}\frac{I_1}{\overline{\alpha}(\lambda_1)} + \frac{I_2}{\alpha(\lambda_2)} + \frac{I_3}{\alpha(\lambda_3)}} \quad \text{Eq. (9)}$$

In the second method (Method 2), the reference band (Band 4) and Plank's law are used to determine $T_g$ and calculate $B(T_g,\lambda_i)$ for the other 3 channels. This method requires measurement of the plume gas temperature. The second method requires determination of plume temperature, which may require some calibration or adding additional spectral bands.

In the third method (Method 3), instead of assuming that all three $B(T_g, \lambda_i)$ values are equal, Method 3 uses ratios of $B(T_g,\lambda_i)/B(T_g,\lambda_{Ref})$ in the expected temperature range (e.g., 800-1200° F.).

Although the absorption coefficient of water vapor in the spectral bands Band 1 through Band 3 is very low, the concentration of water vapor in the flare plume is expected to be orders of magnitude higher than unburned hydrocarbons. The total IR signal from water vapor cannot be ignored. The majority of the water vapor IR interference is eliminated by subtracting the intensity of the reference (Band 4) from the intensities of the three measurement bands. Additional minimization of the water vapor interference can be achieved by using a correction factor. This absorption correction factor $A_{1/4}$ can be derived from Eq. (5). Apply Eq. (5) to water vapor at both spectral bands 1 and 4 and ratio the two:

$$\frac{I_1}{I_4} = \frac{B(T_g, \lambda_1)\alpha(\lambda_1)C_{H2O}L}{B(T_g, \lambda_4)\alpha(\lambda_4)C_{H2O}L} \quad \text{Eq. (10)}$$

$$= \frac{I_1}{I_4}$$

$$= \left[\frac{B(T_g, \lambda_1)}{B(T_g, \lambda_4)}\right]\left[\frac{\alpha(\lambda_1)}{\alpha(\lambda_4)}\right]$$

$$= B_{1/4} \cdot A_{1/4}$$

$$A_{1/4} = \left[\frac{\alpha(\lambda_1)}{\alpha(\lambda_4)}\right] \quad \text{Eq. (11)}$$

where $\alpha(\lambda_1)$ and $\alpha(\lambda_4)$ are absorption coefficients of, for example hydrocarbon, and gaseous water at wavelength $\lambda_1$ and $\lambda_4$, respectively. With this correction factor, Equation (8) becomes following Equation (12)

$$I_i = I_i^* - (I_4^*)(A_{i/4}), (i=1-3) \quad \text{Eq. (12)}$$

where and $I^*_4$ is an intensity of the gaseous water.

The $A_{1/4}$ in the Eq. (11) is the water vapor absorption correction factor. It is calculated based on water vapor absorption coefficients at spectral bands Band1 and Band4. The two values, $\alpha(\lambda_1)$ and $\alpha(\lambda_4)$, are calculated based on the standard water vapor IR spectrum and are independent of specific flare measurement applications because the case-specific parameters, water vapor concentration $C_{H2O}$ and plume path length L in Eq. (10), have been cancelled out. The other term at the right end of Eq. (10), $B_{1/4}$, is actually the ratio used in Method 3 described earlier.

Figure 9:
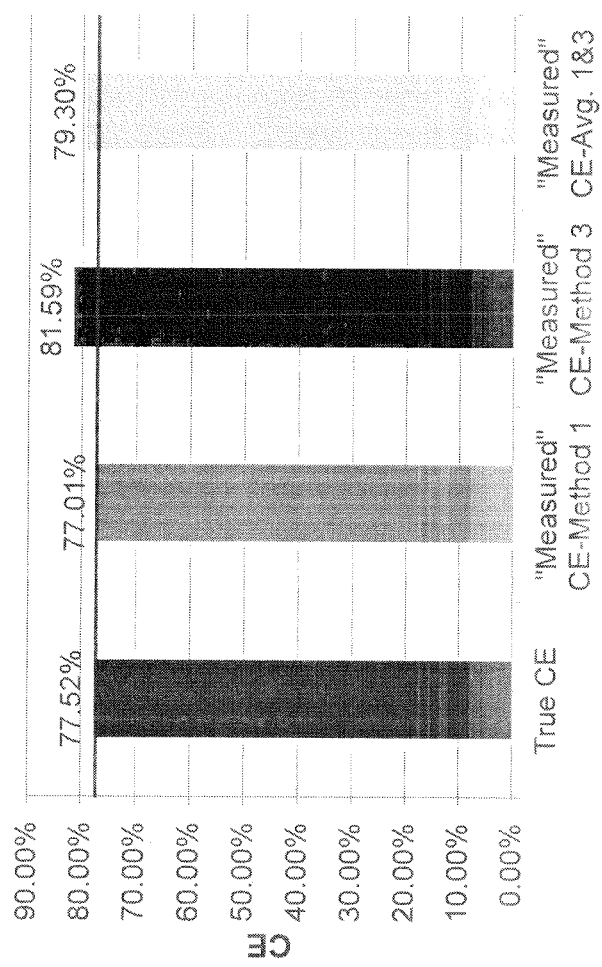
FIG. 9 shows the simulation results of the measurement of combustion efficiency.

Until this point, the IR intensities discussed above are intensities measured immediately adjacent to the flare plume. In the intended deployment situation, the imager is at some distance from the flare (see FIG. 9). The IR rays will travel through the atmospheric layer between the flare and the imager. Theoretically this atmospheric layer will impact the IR intensities measured at the imager due to atmospheric emissivity and absorption. Due to much lower atmospheric temperature as compared to the temperature of the flare flame, this atmospheric impact is minimal. Nevertheless, it may be desirable to account for this impact. This adjustment can be made based on the following Equation (13).

$$I = I_F \exp[-\alpha(\lambda)CL] + B(T_g,\lambda) - B(T_g,\lambda)\exp[-\alpha(\lambda)CL] \qquad \text{Eq. (13)}$$

where I is intensity measured at the imager location; $I_F$ is the intensity immediately adjacent to the flare flame; $T_g$ is an ambient temperature; C is concentrations of species that have significant presence in atmosphere (e.g., water vapor, $CO_2$, methane); and L is the distance from the flare to the imager. The values of $\alpha$ and B will be evaluated at the respective wavelength of each spectral band. Because the impact of the atmospheric layer is very small relative to the flare intensity, approximate values for $\alpha$ and C for common and relevant atmospheric species (i.e., water vapor, $CO_2$, and methane) can be used. Similarly, approximate values for Tg, and B can be used. The distance L can be estimated based on specific deployment condition. All these parameters are referred to as "atmospheric parameters" and stored in the machine readable storage medium.

Figure 6:
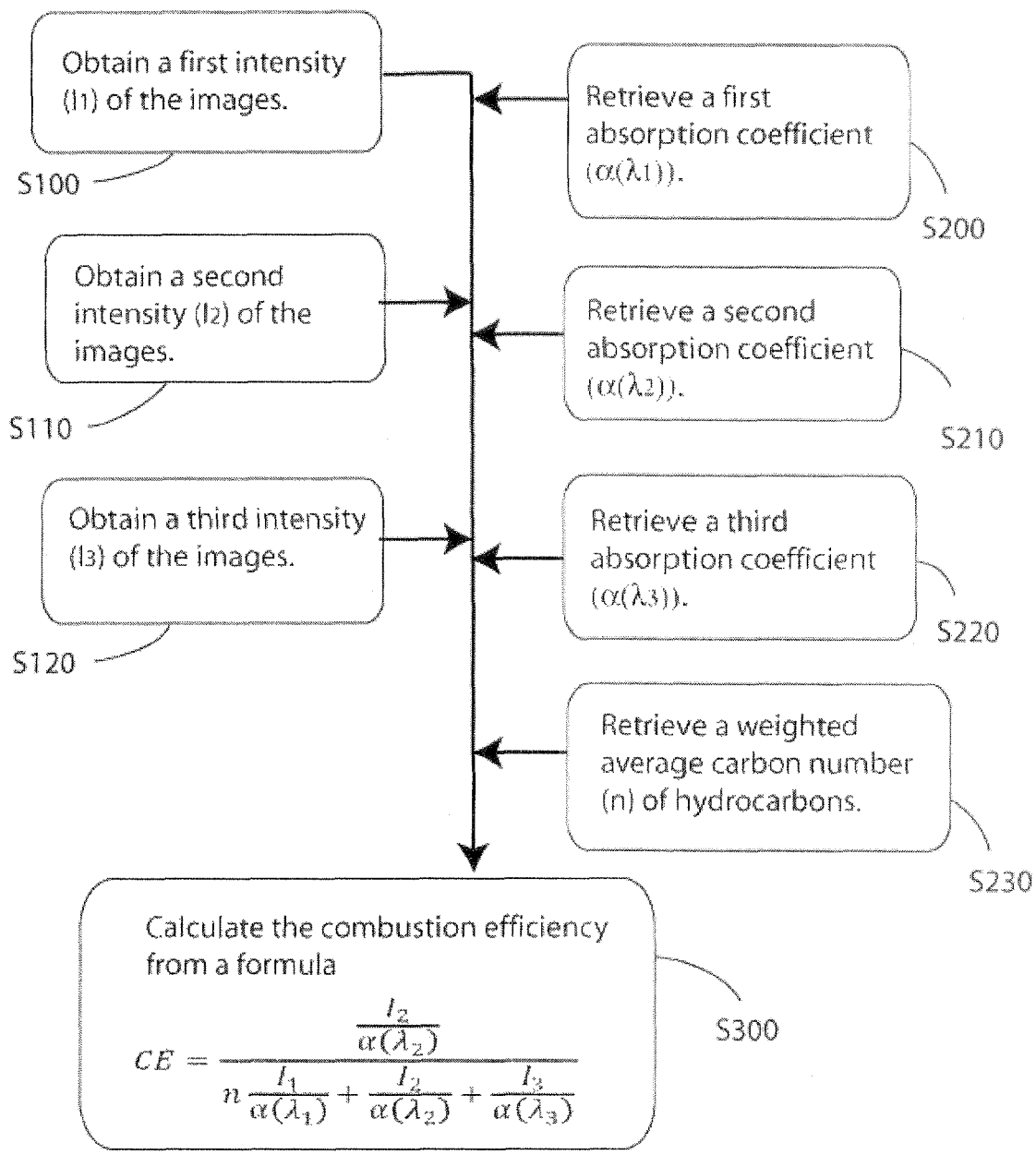
FIG. 6 shows a flowchart illustrating steps for the measurement of combustion efficiency at the super pixel level.

FIG. 6 schematically illustrates steps for the measurement of combustion efficiency based on the principles described above. Referring to FIG. 1, the analysis apparatus is coupled to the detector array 140 to receive data from the detector array 140. The analysis apparatus includes a machine readable storage medium, which provides instructions that cause the analysis apparatus to perform operations to obtain the combustion efficiency of the flare. The analysis apparatus 160 performs the operations illustrated in FIG. 6.

In the first step, the analysis apparatus 160 obtains the first intensity of images of flare that passes though the first one of the sub-filters of one of the bandpass filters of the bandpass filter array 130 (S100). As described above, the first material can be hydrocarbons, which may include methane and propane. In the next step, the analysis apparatus 160 obtains the second intensity of the images of the flare that passes through the second one of the sub-filters of one of the bandpass filters (S110). The second material can be carbon dioxide. Then, the analysis apparatus 160 obtains the third intensity of the images of the flare that passes though the third one of the sub-filters of one of the bandpass filters (S120). The third material can be carbon monoxide. The analysis apparatus 160 also obtains the fourth intensity of the images of the flare that passes though the fourth one of the sub-filters of one of the bandpass filters (S120). This fourth intensity is used as the background reference and is used to adjust the previous three intensities by subtracting the fourth intensity from each of the previous three intensities. The adjusted intensities are used for combustion efficiency calculations. In order to calculate the combustion efficiency, the analysis apparatus 160 retrieves the first absorption coefficient, which can be the weighted average absorption coefficient of hydrocarbon expected in the flare vent gases (S200). The absorption coefficient can be saved in a memory of the analysis apparatus 160 to be retrieved during the operations of the calculation of the combustion efficiency.

As shown in FIG. 5, the absorption coefficient of the hydrocarbon can be an average value of the absorption coefficient in the wavelength bandpass window for hydrocarbon, which may be a wavelength range in the vicinity between 3.3 μm and 3.4 μm.

The analysis apparatus 160 retrieves the second absorption coefficient, which can be the absorption coefficient of carbon dioxide (S210). The absorption coefficient of the carbon dioxide can be an average value of the absorption coefficient in the wavelength bandpass window for carbon dioxide, which may be a wavelength range in the vicinity between 4.2 μm and 4.3 μm.

The analysis apparatus 160 retrieves the third absorption coefficient, which can be the absorption coefficient of carbon monoxide (S220). The absorption coefficient of the carbon monoxide can be an average value of the absorption coefficient in the wavelength bandpass window for carbon monoxide, which may be a wavelength range in the vicinity between 4.7 μm and 4.8 μm.

The analysis apparatus 160 retrieves the weighted average carbon numbers (n) of hydrocarbons expected in the flare vent gas (S230). This weighted average carbon number is saved in a memory of the analysis apparatus 160 to be retrieved during the operations of the calculation of the combustion efficiency.

Finally, the analysis apparatus 160 calculates the combustion efficiency (S300) from the first intensity (S100), the second intensity (S110), the third intensity (S120), the first absorption coefficient (S200), the second absorption coefficient (S210), the third absorption coefficient (S220) and the average carbon number (S230). The Equation (8) or generally the Equation (7) can be used for this calculation.

Figure 7:
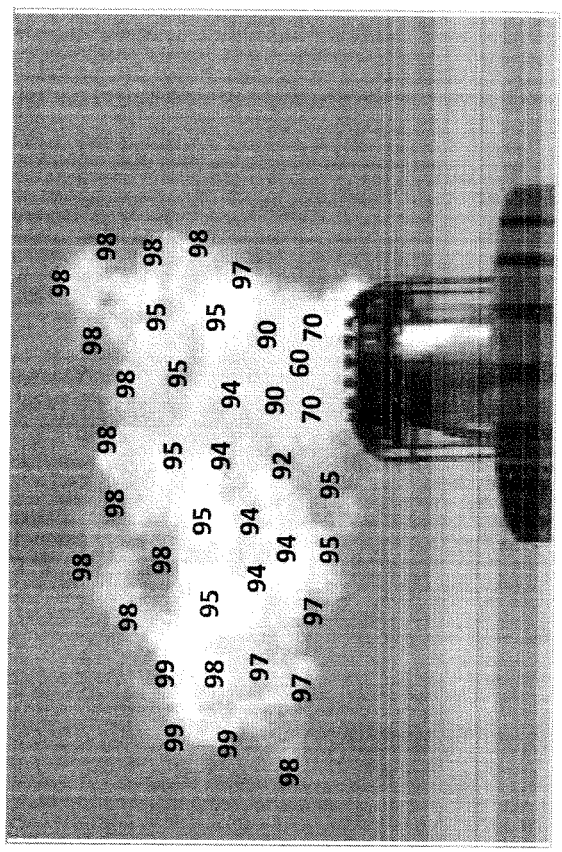
FIG. 7 shows results of the measurement of combustion efficiency of a flare.

Based on the above method, combustion efficiency (CE) can be calculated pixel by pixel, as shown in FIG. 7. Numbers drawn on the photo of flare in FIG. 7 are combustion efficiencies of the locations of numbers, represented by the unit of percentage. Computer vision algorithms can identify the boundaries (the combustion envelope) of the plume and the overall flare CE can be calculated by averaging the CE values of the pixels on the combustion envelope or pixels that represent the flare plume flux. The overall combustion efficiency can then be transmitted to another machine readable storage medium, such as a Distributed Control System or Programmable Logic Controller, where an operator or automated algorithm can adjust flare operations to achieve maximum combustion efficiency.

Model Simulation

Figure 8:
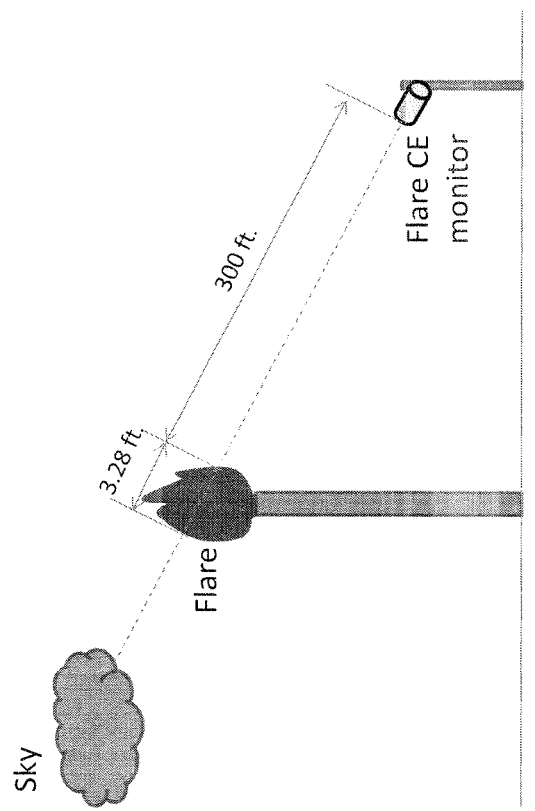
FIG. 8 shows a configuration of model simulations for the measurement of combustion efficiency.

Model simulation was performed to assess the feasibility of the proposed flare CE measurement/monitoring technology and evaluate the sensitivity or vulnerability of the technology with respect to various flare conditions. The simulation included a sky background, a flare, and an atmospheric layer between the flare and the 4-band IR flare CE monitor, as illustrated in FIG. 8. The base case (Case 1) for the simulation included the following key parameters: temperature of the flare plume region represented by a pixel is 800° F., plume path length is 3.28 feet, and distance from the flare to the flare CE monitor is 300 ft. The chemical composition of the gases in the plume is listed in Table 1. For the 300 feet of atmospheric layer, the concentrations of $CO_2$ and water vapor were assumed to be 390 ppm and 1.49%, respectively.

TABLE 1

Gas composition of simulated flare plume (based on combustion of typical refinery fuel gas).

| Compound | Conc. (%) |
|---|---|
| $CO_2$ | 12.000 |
| CO | 0.2000 |
| $H_2O$ | 15.960 |
| Methane (C1) | 0.720 |
| Ethane (C2) | 0.360 |
| Propane (C3) | 0.400 |
| Butane (C4) | 0.040 |
| Pentane (C5) | 0.000 |
| Benzene (C6) | 0.000 |
| Propene (C3) | 0.160 |

Based on the above plume composition, the true CE=77.52%. The simulation was performed based on the above assumed flare characteristics, the amount of IR radiance generated by the flare gases, and the transmittance of the IR radiance from the flare through the atmospheric layer to the 4-band-spectral infrared imager. Based on the IR signal intensity each band of the imager was expected to receive, CE was calculated using the methodology described above. The result of the Base Case (Case 1) simulation is presented in FIG. 9.

The multi-spectral infrared imaging system has a frame rate of 30 frames per second (fps) for each band, i.e., 30 data cubes per second. Each data cube has two spatial dimensions and one spectral dimension providing four two-dimensional sub-frames, each at a rate of 30 fps. In one embodiment, every frame in a conventional sense consists of four sub-frames. All sub-frames have the same field of view and are spatially and temporally synchronized. Dividing the sensor in this manner provides four identical fields of view in different spectral bands. The operators can choose to view images of one of these gases by pressing a selection button. The images for all four bands are also captured and stored for further analysis. Through sensor design, the multi-spectral infrared imaging system has a large dynamic range (linearity range) to prevent signal saturation without sacrificing sensitive for low concentrations. From linearity viewpoint, this range is sufficient to calculate flare combustion efficiency (CE) to the accuracy of at least 0.1%.

The multi-spectral infrared imager described in this specification is aimed at providing real-time measurement of flare efficiency, which would enable operators to adjust flare operating conditions to achieve higher efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the claims.

What is claimed is:

1. A multi-spectral imaging system for measurement of combustion efficiency of a flare, comprising:

an imaging unit capturing images of the flare, the imaging unit producing at least three spatially and temporally synchronized intensities from the images of the flare, a first intensity of said at least three intensities representing an amount of a first material contained in the flare, a second intensity of said at least three intensities representing an amount of a second material contained in the flare, a third intensity of said at least three intensities representing an amount of a third material contained in the flare, the first material including fuel, the second material including carbon dioxide; and an analysis apparatus coupled to the imaging unit, the analysis apparatus including a machine readable storage medium which provides instructions that cause the analysis apparatus to perform operations to obtain the combustion efficiency of the flare, the operations comprising:

acquiring said at least three intensities from the imaging unit;

retrieving a first absorption coefficient, a second absorption coefficient and a third absorption coefficient, which are stored in the machine readable storage medium, the first absorption coefficient being an absorption coefficient of the first material, the second absorption coefficient being an absorption coefficient of the second material, the third absorption coefficient being an absorption coefficient of the third material;

retrieving a weighted average carbon number of the fuel, which is stored in the machine readable storage medium; and producing the combustion efficiency of the flare from said at least three intensities, the first absorption coefficient, the second absorption coefficient, the third absorption coefficient and the weighted average carbon number of the fuel.

2. A multi-spectral imaging system of the claim 1, comprised of the fuel including hydrocarbon, the third material including carbon monoxide.

3. A multi-spectral imaging system of the claim 1, wherein said at least three intensities includes a fourth spatially and temporally synchronized intensity that represents a reference intensity, said producing the combustion efficiency of the flare comprising producing the combustion efficiency of the flare from said at least three intensities including the fourth intensity, the first absorption coefficient, the second absorption coefficient, the third absorption coefficient, and the weighted average carbon number of the fuel.

4. A multi-spectral imaging system of the claim 3, comprised of said producing the combustion efficiency of the flare including calculating the combustion efficiency from a formula $$CE = \frac{\frac{I_2}{\alpha(\lambda_2)}}{n\frac{I_1}{\alpha(\lambda_1)} + \frac{I_2}{\alpha(\lambda_2)} + \frac{I_3}{\alpha(\lambda_3)}}$$

where CE is the combustion efficiency, $I_1$ is a first relative intensity that is the first intensity minus the fourth intensity, $I_2$ is a second relative intensity that is the second intensity minus the fourth intensity, $I_3$ is a third relative intensity that is the third intensity minus the fourth intensity, $\alpha(\lambda_1)$ is the first absorption coefficients at a wavelength of $\lambda_1$, $\alpha(\lambda_2)$ is the second absorption coefficient at a wavelength of $\lambda_2$, $\alpha(\lambda_3)$ are the third absorption coefficient at a wavelength of $\lambda_3$, and n is the weighted average carbon number of the fuel.

5. A multi-spectral imaging system of the claim 4, comprised of the producing the combustion efficiency of the flare further comprising:

calculating water vapor absorption correction factors from a formula $$A_{i/4} = \left[\frac{\alpha(\lambda_i)}{\alpha(\lambda_4)}\right]$$

where i=1-3, $A_{i/4}$ is the water vapor absorption correction factor for the i-th relative intensity, and $\alpha(\lambda_4)$ is an absorption coefficient of gaseous water at wavelength $\lambda_4$; and calculating the i-th relative intensity from a formula $$I_i = I_i^* / -(I_4^*)(A_{i/4})$$

where $I_i$ is the i-th relative intensity, $I_i^*$ is i-th intensity, and $I_4^*$ is an intensity of the gaseous water.

6. A multi-spectral imaging system of the claim 3, comprised of the producing the combustion efficiency of the flare including calculating the combustion efficiency from a formula $$CE = \frac{\frac{I_2}{B(T_g, \lambda_2)\alpha(\lambda_2)}}{n\frac{I_1}{B(T_g, \lambda_1)\alpha(\lambda_1)} + \frac{I_2}{B(T_g, \lambda_2)\alpha(\lambda_2)} + \frac{I_3}{B(T_g, \lambda_3)\alpha(\lambda_3)}}$$

where CE is the combustion efficiency, $I_1$ is a first relative intensity that is the first intensity minus the fourth intensity, $I_2$ is a second relative intensity that is the second intensity minus the fourth intensity, $I_3$ is a third relative intensity that is the third intensity minus the fourth intensity, $\alpha(\lambda_i)$ is the first absorption coefficients at a wavelength of $\lambda_1$, $\alpha(\lambda_2)$ is the second absorption coefficient at a wavelength of $\lambda_2$, and $\alpha(\lambda_3)$ are the third absorption coefficient at a wavelength of $\lambda_3$, n is the weighted average carbon number of the fuel, $B(T_g, \lambda_1)$ is a black body radiation of the first material at a temperature $T_g$ and a wavelength $\lambda_1$, $B(T_g, \lambda_2)$ is a black body radiation of the second material at a temperature $T_g$ and a wavelength $\lambda_2$, $B(T_g, \lambda_3)$ is a black body radiation of the third material at a temperature $T_g$ and a wavelength $\lambda_3$, and $T_g$ is temperature of the flare, images of which are captured by the imaging unit.

7. A multi-spectral imaging system of the claim 6, comprised of the producing the combustion efficiency of the flare further comprising:

measuring the temperature $T_g$ of the flare; and retrieving the black body radiations of the first material $B(T_g, \lambda_1)$, the black body radiation of the second material $B(T_g, \lambda_2)$, and the black body radiation of the third material $B(T_g, \lambda_3)$, which are stored in the machine readable storage medium.

8. A multi-spectral imaging system of the claim 6, comprised of the producing the combustion efficiency of the flare further comprising:

calculating water vapor absorption correction factors from a formula $$A_{i/4} = \left[\frac{\alpha(\lambda_i)}{\alpha(\lambda_4)}\right]$$

where i=1-3, $A_{i/4}$ is the water vapor absorption correction factor for the i-th relative intensity, and $\alpha(\lambda_4)$ is an absorption coefficient of gaseous water at wavelength $\lambda_4$; and calculating the i-th relative intensity from a formula $$I_i = I_i^* / -(I_4^*)(A_{i/4})$$

where $I_i$ is the i-th relative intensity, $I_i^*$ is i-th intensity, and $I_4^*$ is an intensity of the gaseous water.

9. A multi-spectral imaging system of the claim 3, comprised of the imaging unit comprising:

an objective lens;

a detector array including a plurality of detectors, each of the detectors including a plurality of sub-detectors, the detector array detecting intensities from the images of the flare;

a micro-lens array disposed between the objective lens and the detector array, the micro-lens array including a plurality of micro-lenses;

a bandpass filter array disposed between the micro-lens array and the detector array, the bandpass filter array including a plurality of bandpass filters, each of the bandpass filters including a plurality of sub-filters, the sub-filters having different wavelength bandpass windows from each other, the images of the flare passing through one of the micro-lenses being transmitted to one of the bandpass filters and being detected by one of the detectors.

10. A multi-spectral imaging system of the claim 9, wherein the first intensity is an intensity of the images of the flare passing through a first one of the sub-filters, the second intensity is an intensity of the images of the flare passing through a second one of the sub-filters, the third intensity is an intensity of the images of the flare passing through a third one of the sub-filters, and the fourth intensity is an intensity of the images of the flare passing through a fourth one of the sub-filters.

11. A multi-spectral imaging system of the claim 10, comprised of the first one of the sub-filters having a wavelength bandpass window of absorption of the fuel.

12. A multi-spectral imaging system of the claim 11, wherein the wavelength bandpass window of the first one of the sub-filters includes a wavelength range between 3.3 μm and 3.4 μm.

13. A multi-spectral imaging system of the claim 10, comprised of the second one of the sub-filters having a wavelength bandpass window of absorption of carbon dioxide.

14. A multi-spectral imaging system of the claim 13, wherein the wavelength bandpass window of the second one of the sub-filters includes a wavelength range between 4.2 μm and 4.3 μm.

15. A multi-spectral imaging system of the claim 10, comprised of the third one of the sub-filters having a wavelength bandpass window of absorption of carbon monoxide.

16. A multi-spectral imaging system of the claim 15, wherein the wavelength bandpass window of the third one of the sub-filters includes a wavelength range between 4.7 μm and 4.8 μm.

17. A computer-readable storage device, which provides instructions that cause a machine apparatus to perform operations to obtain combustion efficiency of a flare, the operations comprising:

acquiring at least three spatially and temporally synchronized intensities from an imaging unit capturing images of the flare, a first intensity of said at least three intensities representing an amount of a first material contained in the flare, a second intensity of said at least three intensities representing an amount of a second material contained in the flare, a third intensity of said at least three intensities representing an amount of a third material contained in the flare, the first material including fuel, the second material including carbon dioxide;

retrieving a first absorption coefficient, a second absorption coefficient and a third absorption coefficient, which are stored in the machine readable storage medium, the first absorption coefficient being an absorption coefficient of the first material, the second absorption coefficient being an absorption coefficient of the second material, the third absorption coefficient being an absorption coefficient of the third material;

retrieving a weighted average carbon number of the fuel, which is stored in the machine readable storage medium; and producing the combustion efficiency of the flare from said at least three intensities, the first absorption coefficient, the second absorption coefficient, the third absorption coefficient and the weighted average carbon number of the fuel.

18. The computer-readable storage device of the claim 17, comprised of the fuel including hydrocarbon, the third material including carbon monoxide.

19. The computer-readable storage device of the claim 17, wherein said at least three intensities includes a fourth intensity that represents a reference intensity, said producing the combustion efficiency of the flare comprising producing the combustion efficiency of the flare from said at least three intensities including the fourth intensity, the first absorption coefficient, the second absorption coefficient, the third absorption coefficient, and the weighted average carbon number of the fuel.

20. The computer-readable storage device of the claim 19, comprised of said producing the combustion efficiency of the flare including calculating the combustion efficiency from a formula $$CE = \frac{\frac{I_2}{\alpha(\lambda_2)}}{n\frac{I_1}{\alpha(\lambda_1)} + \frac{I_2}{\alpha(\lambda_2)} + \frac{I_3}{\alpha(\lambda_3)}}$$

where CE is the combustion efficiency, $I_1$ is a first relative intensity (the first intensity minus the fourth intensity), $I_2$ is a second relative intensity (the second intensity minus the fourth intensity), $I_3$ is a third relative intensity (the third intensity minus the fourth intensity), $\alpha(\lambda_1)$ is the first absorption coefficients at a wavelength of $\lambda_1$, $\alpha(\lambda_2)$ is the second absorption coefficient at a wavelength of $\lambda_2$, $\alpha(\lambda_3)$ are the third absorption coefficient at a wavelength of $\lambda_3$, and n is the weighted average carbon number of the fuel.

21. A computer-readable storage device of the claim 20, comprised of the producing the combustion efficiency of the flare further comprising:

calculating water vapor absorption correction factors from a formula $$A_{i/4} = \left[\frac{\alpha(\lambda_i)}{\alpha(\lambda_4)}\right]$$

where i=1-3, $A_{i/4}$ is the water vapor absorption correction factor for the i-th intensity, and $\alpha(\lambda_4)$ is an absorption coefficient of gaseous water at wavelength $\lambda_4$; and calculating the i-th relative intensity from a formula $$I_i = I_i^* - (I_4^*)(A_{i/4})$$

where $I_i$ is the i-th relative intensity, $I^*_i$ is i-th intensity, and $I^*_4$ is an intensity of the gaseous water.

22. The computer-readable storage device of the claim 19, comprised of the producing the combustion efficiency of the flare including calculating the combustion efficiency from a formula $$CE = \frac{\frac{I_2}{B(T_g, \lambda_2)\alpha(\lambda_2)}}{n\frac{I_1}{B(T_g, \lambda_1)\alpha(\lambda_1)} + \frac{I_2}{B(T_g, \lambda_2)\alpha(\lambda_2)} + \frac{I_3}{B(T_g, \lambda_3)\alpha(\lambda_3)}}$$

where CE is the combustion efficiency, $I_1$ is a first relative intensity (the first intensity minus the fourth intensity), $I_2$ is a second relative intensity (the second intensity minus the fourth intensity), $I_3$ is a third relative intensity (the third intensity minus the fourth intensity), $\alpha(\lambda_1)$ is the first absorption coefficients at a wavelength of $\lambda_1$, $\alpha(\lambda_2)$ is the second absorption coefficient at a wavelength of $\lambda_2$, and $\alpha(\lambda_3)$ are the third absorption coefficient at a wavelength of $\lambda_3$, n is the weighted average carbon number of the fuel, $B(T_g, \lambda_1)$ is a black body radiation of the first material at a temperature $T_g$ and a wavelength $\lambda_1$, $B(T_g, \lambda_2)$ is a black body radiation of the second material at a temperature $T_g$ and a wavelength $\lambda_2$, $B(T_g, \lambda_3)$ is a black body radiation of the third material at a temperature $T_g$ and a wavelength $\lambda_3$, and $T_g$ is temperature of the flare, images of which are captured by the imaging unit.

23. A computer-readable storage device of the claim 22, comprised of the producing the combustion efficiency of the flare further comprising:

measuring the temperature $T_g$ of the flare; and retrieving the black body radiations of the first material $B(T_g, \lambda_1)$, the black body radiation of the second material $B(T_g, \lambda_2)$, and the black body radiation of the third material $B(T_g, \lambda_3)$, which are stored in the machine readable storage medium.

24. A computer-readable storage device of the claim 22, comprised of the producing the combustion efficiency of the flare further comprising:

calculating water vapor absorption correction factors from a formula $$A_{i/4} = \left[\frac{\alpha(\lambda_i)}{\alpha(\lambda_4)}\right]$$

where i=1-3, $A_{i/4}$ is the water vapor absorption correction factor for the i-th intensity, and $\alpha(\lambda_4)$ is an absorption coefficient of gaseous water at wavelength $\lambda_4$; and calculating the i-th relative intensity from a formula $$I_i = I_i^* - (I_4^*)(A_{1/4})$$

where $I_i$ is the i-th relative intensity, $I^*_i$ is i-th intensity, and $I^*_4$ is an intensity of the gaseous water.

* * * * *